Nov. 16, 1937. F. A. NICHOLSON ET AL 2,099,220
MECHANISM TO MAINTAIN CONSTANT THE REQUIRED
LENGTH OF AN ENDLESS DRIVING MEANS
Filed Dec. 21, 1936  2 Sheets-Sheet 1

INVENTORS
WILMOT T. PRITCHARD
FREDERICK A. NICHOLSON
BY
ATTORNEY

Nov. 16, 1937.  F. A. NICHOLSON ET AL  2,099,220
MECHANISM TO MAINTAIN CONSTANT THE REQUIRED
LENGTH OF AN ENDLESS DRIVING MEANS
Filed Dec. 21, 1936    2 Sheets-Sheet 2

INVENTORS
WILMOT T. PRITCHARD
FREDERICK A. NICHOLSON
BY
ATTORNEY

Patented Nov. 16, 1937

2,099,220

UNITED STATES PATENT OFFICE 2,099,220

MECHANISM TO MAINTAIN CONSTANT THE REQUIRED LENGTH OF AN ENDLESS DRIVING MEANS

Frederick A. Nicholson and Wilmot T. Pritchard, Seattle, Wash., assignors to Stetson-Ross Machine Company, Seattle, Wash., a corporation of Washington Application December 21, 1936, Serial No. 116,962

6 Claims. (Cl. 74—242.15)

This invention relates to a driving mechanism and particularly to means to maintain substantially constant the required length of an endless driving means to be threaded over a plurality of wheels some of which are mounted on movable supports.

This application is related to our co-pending applications Serial Nos. 116,960, 116,961, 116,963, 116,964 and 116,965, which are being simultaneously filed herewith and which co-pending applications claim some of the inventions herein disclosed.

In the prior art where an endless driving means were threaded over a plurality of wheels, some of which wheels were mounted on movable supports, it has been the practice to use tightener means to maintain the proper tension on the endless driving means. Such devices operated satisfactorily where the tightener was placed on the slack side of the endless driving means. However, such prior art devices, which generally included a spring loaded or gravity weighted tightener, did not operate satisfactorily where the direction of travel of the driving means was subject to reversal. This for the simple reason that upon reversal, the tightener was no longer on the slack side of the driving means. Where reversible endless driving means were employed over a plurality of wheels, some of which were mounted on movable supports, the prior art has gone to complex mechanisms in an attempt to maintain the desired tension of the endless driving means. Such prior art devices were not satisfactory as they did not provide the desired degree of simplicity to prevent costly shut-downs and continual repair of the mechanism. Also where heavy driving strains were encountered, the difficulties were increased.

It is the object of our invention to provide a simple, efficient and practical mechanism which will permit an endless driving means to be threaded over a plurality of wheels, some of which are mounted on movable supports, and where the length of the endless driving means required will remain substantially constant despite the movement of some of the wheel bearing means and wheel means thereon.

It is a further object of this invention to provide a wheel-endless driving mechanism which includes a wheel which is subject to continual movement during operation.

It is a further object of this invention to provide in such mechanism a driving connection with a wheel which is substantially floatingly mounted relatively to the driving means.

It is more particularly an object of this invention to provide in such a mechanism two spaced apart wheels, a third movably mounted wheel positioned substantially intermediate of and offset relatively to said two wheels, and an endless driving means threaded over all of said wheels to the end of requiring a substantially constant length of endless driving means, despite the movement required of said third wheel.

It is more particularly an object of this invention to provide in such mechanism, means which will provide substantially uniform tension of the endless driving means where a wheel moves within the requirements necessary to drive the resiliently mounted feeding means of a planing device.

The above mentioned general objects of our invention, together with others inherent in the same, are attained by the mechanism illustrated in the following drawings, the same being preferred exemplary forms of embodiment of our invention, throughout which drawings like reference numerals indicate like parts:

In describing and illustrating this invention, we have shown the same as applicable in connection with the driving of endless feed beds and feed rolls of a planing device. It is to be expressly understood that this invention is not limited to any such specific application and the same is set forth only as illustrative of one environment in which this invention may be utilized. Also for purposes of definiteness of illustration, we have illustrated the invention in connection with an endless sprocket chain threaded over a plurality of sprockets. In this connection the mechanism may obviously be used in connection with any wheel means and endless driving means threaded thereover, and sprockets and an endless sprocket chain are only examples thereof.

Figure 1:
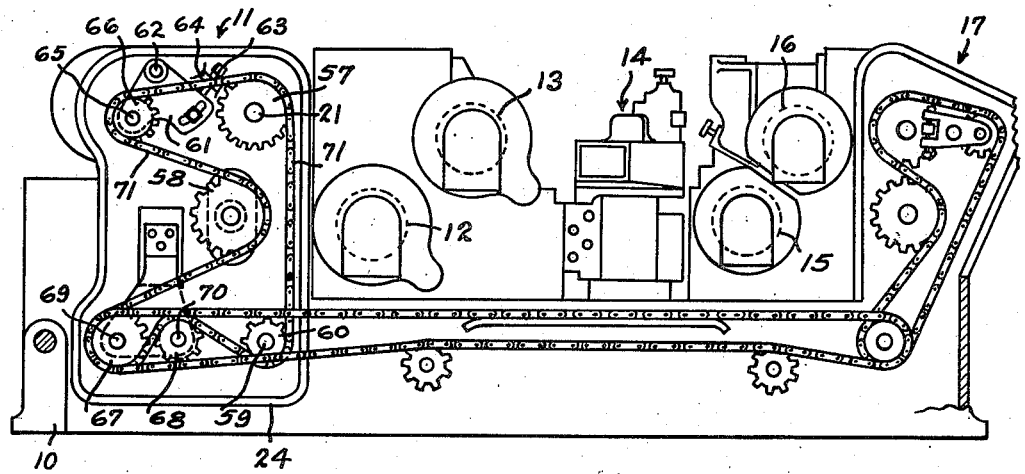
Figure 1 is a view in elevation, with parts removed, of a planer mechanism embodying this invention.

In Figure 1 all of the details of the planer mechanism are not shown and will be only generally described, as such details are not considered essential to this invention.

A frame 10 supports the planer mechanism. The in feeding mechanism, generally indicated by 11 in Figure 1, illustrates the invention of this application and will be particularly discussed after a general reference to the other portions of Figure 1. This feeding mechanism urges lumber stock past a lower cutter head mechanism 12 and an upper cutter head mechanism 13. The lumber is then urged past edge matcher mechanism indicated generally by 14. Lower and upper face pattern forming cutter head mechanisms 15 and 16 may be provided in connection with the planer mechanism.

The out feeding mechanism, generally indicated by 17, and shown at the right of Figure 1 of the drawings, is the subject matter of our copending application Serial No. 116,960. This out feeding mechanism serves to drive feed rolls to remove the finished lumber from the machine.

Figure 4:
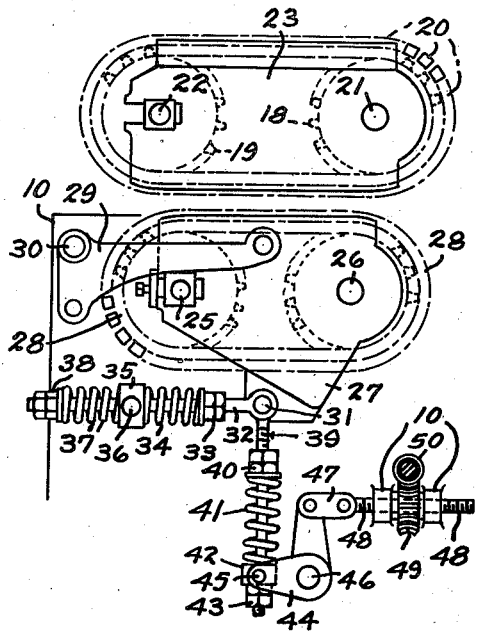
Fig. 4 is a detached elevation, with parts broken away, showing the upper and lower endless feed beds and the resilient supporting means for the lower feed bed.

Referring to Fig. 4 of the drawings: The upper feed bed comprises sprockets 18 and 19. Endless feed bed conveyor chain 20 is threaded over sprockets 18 and 19. Shafts 21 and 22 are mounted on the frame 23 of the upper feed bed. These shafts 21 and 22 are also mounted on movably mounted frame member 24, as is more particularly discussed in our copending application Serial No. 116,961, wherein such invention is claimed.

The lower feed bed comprises sprockets similar to sprockets 18 and 19 mounted on shafts 25 and 26. These shafts 25 and 26 are mounted on the frame 27 of the lower feed bed, but such shafts are independently mounted on the movably mounted frame 24. An endless conveyor chain 28 is threaded over the sprockets in the lower feed bed supported from shafts 25 and 26. The upper feed bed or the lower feed bed may be provided with adjusting means to provide the proper tension of the endless feed bed conveyor chains 20 and 28. This may be accomplished by providing any well known adjusting mechanism, such as illustrated in connection with the shaft 25.

The lower feed bed, see Fig. 4, is mounted for resilient adjustable support, which supporting structure is the subject matter of our co-pending application Serial No. 116,963. This is accomplished by pivotally securing the upper portion of frame 27 to the link 29. This link 29 is pivotally secured by pivot means 30 to the main frame 10 of the machine. The lower portion of the frame 27 is secured by pivot means 31 to horizontal link 32. Nut means 33 is threadedly secured on link 32. A spring 34 is slidably positioned on horizontal link 32 between the nut means 33 and a pivot block 35. This pivot block 35 is slidably positioned on link 32 and is secured by a pivot means 36 to the main frame 10 of the machine. Another spring 37, similar to spring 34, is slidably positioned on horizontal link 32 between said pivot block 35 and the nut means 38, which is threadedly connected with said link 32. The springs 34 and 37 are compressed by the nut means 33 and 38 so that the lower feed bed tends to assume a horizontal position when pivotally supported from link 29.

Another link means 39 is pivotally secured to the frame 27 and may connect with the pivot means 31. This link means 39 is provided with nut means 40 threadedly secured to the link means 39. A spring 41 is slidably positioned on the link 39 between said nut means 40 and a collar 42 which is slidingly positioned on said link means 39. Nut means 43 secures collar 42 in place. Collar 42, and in turn the lower feed bed, may be adjustably positioned by any suitable means, such as by bell crank 44 having one arm thereof pivotally secured to the collar 42 by pivot means 45. The bell crank 44 is secured by pivot means 46 to the main frame 10 of the machine. The other arm of the bell crank 44 is pivotally connected with a link 47 which is in turn pivotally connected with a screw 48. A worm wheel 49 is threadedly connected with screw 48. The worm wheel 49 is held in place between projecting portions of the main frame 10. A worm 50 engages with worm wheel 49. Through the mechanism described the lower bed may be raised or lowered and the springs 41, 34 and 37 supporting the lower bed will provide substantially the same degree of tension for the lower feed bed in any adjusted position thereof.

The means for adjusting the movably mounted frame 24 is not illustrated in this application as the same constitutes no part of the invention hereof, but the same is fully illustrated and described in our co-pending application Serial No. 116,961.

Figure 2:
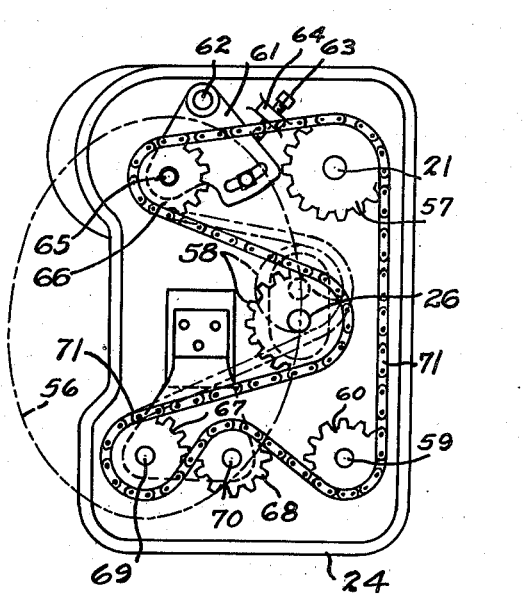
Fig. 2 is a detached fragmentary view in elevation of the portion of the driving mechanism embodied in this invention, showing by dot and dash lines a position which the movably mounted wheel may assume, and also showing by dot and dash lines the elliptical path which the center of such movably mounted wheel would tend to follow.

Referring to Fig. 2: The shaft 21, upon which is mounted sprocket 18 of the upper feed bed, is journaled in the movable plate 24 and has sprocket wheel 57 mounted thereon. The shaft 26, upon which is mounted a sprocket of the lower feed bed, passes through the movable plate 24 and is not connected therewith. On this shaft 26 is mounted a sprocket wheel 58. A stub shaft 59 is mounted on the movable plate 24 and a sprocket wheel 60 is mounted on said stub shaft 59.

A plate 61, see Fig. 1, is pivotally secured on pivot 62 to the movably mounted frame 24. Adjusting screws 63 threaded through lugs 64 permit angular adjusting movement of plate 61 relative to the movably mounted frame 24. A stub shaft 65 is mounted on the plate 61. For purpose of clearness of illustration the stub shaft 65 and sprocket wheel 66 are shown in Fig. 2 of the drawings without the plate 61 and adjusting means therefor. This adjusting means is provided for initial adjustment of the endless driving chain 71. Sprocket wheels 67 and 68 are mounted on shafts 69 and 70 which are secured to the main frame 10 of the machine.

Thus, sprocket wheels 57, 66 and 60 are moved upwardly with the adjustable frame 24 and the sprockets 67, 68 and 58, being independent of the adjustable plate, will not be moved therewith. This provides for an initial adjustment of the upper feed bed relative to the lower feed bed and is the subject matter of our co-pending application Serial No. 116,961. As the compensating means, which is the subject matter of this invention, relates to the relative movement of the sprocket wheel 58, all of the sprocket wheels, except 58, will be considered stationary, as the device will operate under such conditions.

As the frame 27 of the lower feed bed is resiliently supported by springs 34, 37 and 41, the sprocket wheel 58 supported from the shaft 26, will tend to move in substantially a vertical path. At the same time the endless chain 71, which is threaded over the sprocket wheels 67, 68, 60, 57 and 66, will tend to assume the elliptical path numbered 56 in Fig. 2 and shown by dot and dash lines. Through the central portion of the said elliptical path, in which the center of the shaft mounting sprocket wheel 58 moves, as required in a planing machine, there is substantially no difference between the substantially vertical plane in which the sprocket wheel 58 is actually moved, and the elliptical path wherein the one lap of chain between sprocket wheel 58 and sprocket wheel 66 exactly compensates for the difference in length of the lap of chain between the sprocket wheel 68 and 60. Although the path of the sprocket wheel 58 is somewhat complex (see Fig. 3), due to the fact of the pivotal support from the link or arm 29 on the pivot 30, and the resilient side support offered by springs 34 and 37, and the lower support offered by spring 41, still we have found in practical operation that the path of the sprocket wheel 58 supported on the shaft 26 is substantially a vertical plane and will permit compensation as is indicated particularly in Fig. 2 of the drawings.

Figures 3, 5, 6:
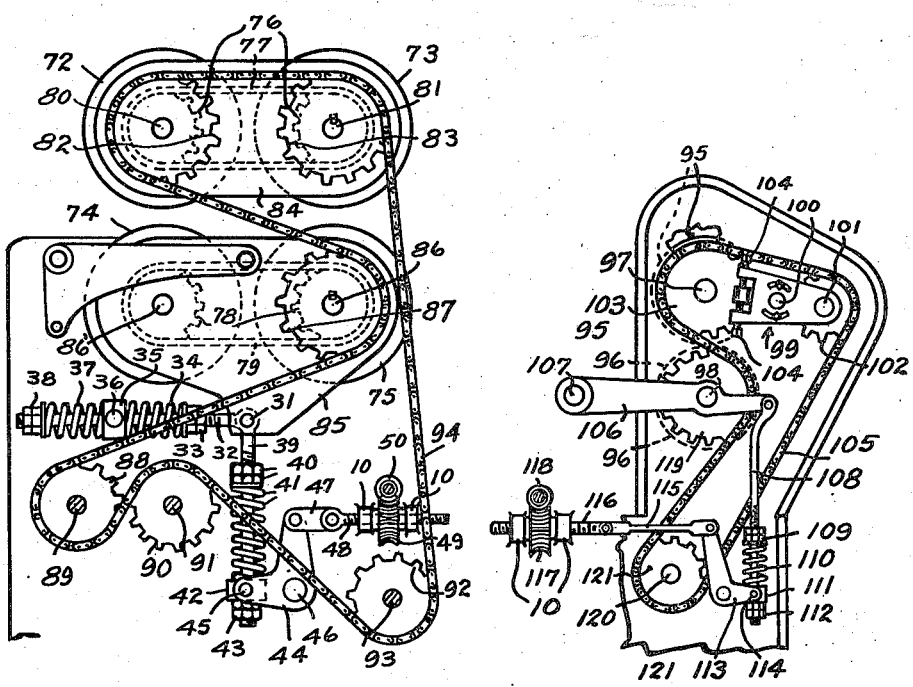
Fig. 3 is a schematic view illustrating a position of the upper feed bed and positions which the lower feed bed may assume.
Fig. 5 is a view of a modified form of the invention similar to Fig. 4, except showing a pair of upper feed rolls and a pair of lower rolls instead of feed beds.
Fig. 6 is a view of a still further modified form of the invention similar to Fig. 5, except showing the invention in connection with one upper feed roll and one lower feed roll.

In Fig. 5 of the drawings two upper feed rolls 72 and 73 are illustrated and lower feed rolls 74 and 75 are also illustrated. If such feed rolls are used they will replace the endless feeding mechanism most clearly illustrated in Fig. 4 of the drawings. Upper feed rolls 72 and 73 are connected by wheels 76 and endless driving means 77. The lower feed rolls 74 and 75 are mounted on shafts 86 and 86' and are connected together by wheels 78 and endless driving means 79. The upper feed rolls 72 and 73 are mounted on shafts 80 and 81 respectively. On these shafts 80 and 81, respectively, are also mounted sprocket wheels 82 and 83. The supporting frame 84 for the upper feed rolls supports the shafts 80 and 81 and said frame is connected with a movable frame, such as the movably mounted frame 24 heretofore discussed. The supporting frame 85 for the lower feed rolls may be supported in a manner identical with the support for the frame 27 of the lower feed bed, and in the interest of brevity similar numbers will be applied to similar parts, and no further description will be given.

The lower feed roll 75 is mounted on a shaft 86, which shaft 86 is fixedly connected with a sprocket wheel 87. A driving sprocket wheel 88 is connected to a source of power (not shown) and is rotatably supported on a shaft 89 mounted on the main frame 10 of the machine. Another sprocket wheel 90 is journaled on a shaft 91, which is also mounted on the main frame 10 of the machine. The sprocket wheel 92 is journaled on a stub shaft 93 which is supported in the movably mounted frame 24.

In this form of the invention, where feed rolls are employed, the endless chain 94 is threaded around sprocket wheels 92, 83, 82, 87, 88 and 90, and the parts operate similarly to the endless feed mechanism for the conveyor beds, previously described.

Here the shaft 86 supporting the sprocket wheel 87 moves identically with the movement of the sprocket wheel 58 supported on the shaft 26, the movement of which was discussed particularly in connection with Fig. 2. Similar compensation will obtain for the movement of shaft 86 and sprocket wheel 87.

In Fig. 6 of the drawings, we have illustrated a still further modified form of the invention where one upper and one lower feed roll are employed at the in feeding end of the machine. In this drawing, an upper feed roll 95, only a fragment of which is shown for purpose of clearness, and a lower feed roll 96 is similarly illustrated. The upper feed roll is journaled on a shaft 97 and a lower feed roll is journaled on a shaft 98. The shaft 97 of the upper feed roll 95 is mounted on an adjustable plate 99. The adjustable plate 99 is mounted on pivot means 100, which pivot means is in turn mounted on the main frame 10 of the machine. The adjustable means 99 supports a stub shaft 101, which stub shaft in turn supports a sprocket wheel 102. A sprocket wheel 103 is supported on the shaft 97. By operation the adjustable screws 104, the shafts 97 and 101 may be angularly adjusted relative to each other. This adjusting feature is more particularly described in our co-pending application Serial No. 116,960 and provides for an initial adjustment of the endless driving chain 105 threaded over sprocket wheels 102 and 103. As the adjusting means, which is the subject matter of this invention, may be used either with or without such adjustable plate 99, the same is not here considered in detail.

The shaft 98 which supports the lower feed roll 96 is journaled in a link means 106. This link means is pivotally supported by pivot means 107 from the main frame 10 of the machine. The other end of the link means 106 is pivotally secured to a link means 108. On this link means 108 is fixedly secured a collar 109. A spring means 110 is slidably mounted on the link means 108 and is positioned between the collar 109 and another collar 111. Nut means 112 are provided to obtain the proper tension of spring 110. One arm of the bell crank 113 is secured by a pivot means 114 to the collar 111. The other arm of the bell crank 113 is pivotally connected with a link 115, which link is connected with a screw 116. This screw 116 is threadedly connected with a worm wheel 117. The worm wheel 117 is secured between lug portions of the main frame 10. A worm 118 meshes with the worm wheel 117. Thus the link means 106 supporting the lower feed roll 96, together with its connected parts, is resiliently supported and may be adjusted without changing the resilient support of the spring 110.

A sprocket wheel 119 is secured on shaft 98. A shaft 120 secured to the main frame 10 of the machine rotatably supports a sprocket wheel 121. The endless driving chain 105 is threaded about sprocket wheels 102, 103 and 121. The sprocket wheel 121 is connected to a source of power (not shown).

Thus the sprocket wheel 119 is supported for substantially vertical movement between two sprocket wheels 103 and 121, and as this sprocket wheel 119 moves upwardly and downwardly, compensation for movement of sprocket wheel 119 will take place similarly to the compensation for movement of sprocket wheel 58, particularly described in connection with Fig. 2.

In the foregoing we have described the invention as applicable to a planing device, such as disclosed in our co-pending application Serial No. 91,568. In such a planing device the lower bed is resiliently mounted as distinguished from the commercial prior art planing machines where the upper beds are resiliently mounted. Obviously the invention herein can be readily adapted to ordinary planing machines, as well as to the planing mechanism disclosed in said application Serial No. 91,568.

Obviously, changes may be made in the forms, dimensions and arrangement of the parts of our invention, without departing from the principle thereof, the above setting forth only preferred forms of embodiment.

We claim:

1. In a device of the class described, two spaced apart wheels; fixedly mounted bearing means supporting each of said two wheels for rotary movement; a third wheel positioned substantially intermediate of and off-set relatively to said two wheels; movably mounted bearing means supporting said third wheel for rotary movement and for movement substantially in a plane approximately parallel to a plane passing between said two wheels; and endless driving means threaded over said two wheels and said third wheel, whereby substantial movement of said third wheel in said plane may obtain without requiring a material change of length of said endless driving means.

2. In a device of the class described, two substantially vertically spaced apart wheels; fixedly mounted bearing means supporting each of said two wheels for rotary movement; a third wheel positioned substantially intermediate of and laterally off-set relatively to said two wheels; movably mounted bearing means supporting said third wheel for movement, substantially in an approximately vertical plane; and endless driving means threaded over said two wheels and said third wheel, whereby substantial vertical movement of said third wheel may obtain without requiring a material change of length of said endless driving means.

3. In a device of the class described, a driving wheel and a driven wheel positioned in substantially vertically spaced apart relation; fixedly mounted bearing means supporting said driving wheel and said driven wheel for rotary movement; another driven wheel positioned substantially intermediate of and laterally off-set relatively to said driving wheel and said driven wheel; movably mounted bearing means supporting said other driven wheel for rotary movement and for movement substantially in an approximately vertical plane; and endless driving means threaded over said driving wheel, said driven wheel and said other driven wheel, whereby substantial vertical movement of said other driven wheel may obtain without requiring a material change of length of said endless driving means.

4. In a device of the class described, two spaced apart wheels; fixedly mounted bearing means supporting each of said two wheels for rotary movement; a third wheel positioned substantially intermediate of and offset relatively to said two wheels; movably mounted bearing means supporting said third wheel for rotary movement and for movement substantially in a plane approximately parallel to a plane passing between said two wheels; other wheel means offset relatively to both said two spaced apart wheels and said third wheel and offset in the same direction as said third wheel; and endless driving means threaded over one of said two spaced apart wheels, over said third wheel, over the other of said two spaced apart wheels, over said other wheel means, and back to the one of said two spaced apart wheels, whereby substantial movement of said third wheel in said plane may obtain without requiring a material change of length of said endless driving means.

5. In a device of the class described, two substantially vertically spaced apart wheels; fixedly mounted bearing means supporting each of said two wheels for rotary movement; a third wheel positioned substantially intermediate of and laterally offset relatively to said two wheels; movably mounted bearing means supporting said third wheel for movement substantially in an approximately vertical plane; other wheel means laterally offset relatively to both said two spaced apart wheels and said third wheel and laterally offset in the same direction of said third wheel; and an endless driving means threaded over one of said two spaced apart wheels, over said third wheel, over the other of said two spaced apart wheels, over said other wheel means and back to the one of said two spaced apart wheels, whereby substantial vertical movement of said third wheel may obtain without requiring a material change of length of said endless driving means.

6. In a device of the class described, a driving wheel and a driven wheel positioned in substantially vertically spaced apart relation; fixedly mounted bearing means supporting said driving wheel and said driven wheel for rotary movement; another driven wheel positioned substantially intermediate of and laterally offset relatively to said driving wheel and said driven wheel; movably mounted bearing means supporting said other driven wheel for rotary movement and for movement substantially in an approximately vertical plane; idly mounted wheel means laterally offset relatively to said driving wheel, said driven wheel, and said other driven wheel and laterally offset in the same direction as said other driven wheel; and endless driving means threaded over said driving wheel, over said other driven wheel, over said driven wheel, over said idly mounted wheel, and back to the said driving wheel, whereby substantial vertical movement of said other driven wheel may obtain without requiring a material change of length of said endless driving means.

FREDERICK A. NICHOLSON.
WILMOT T. PRITCHARD.